US006283530B1

(12) United States Patent
Hollerbach

(10) Patent No.: US 6,283,530 B1
(45) Date of Patent: Sep. 4, 2001

(54) ARRANGEMENT FOR MOVABLE PARTS ON VEHICLES

(75) Inventor: Bernhard Hollerbach, Steingaden (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/315,232

(22) Filed: May 20, 1999

(30) Foreign Application Priority Data

May 20, 1998 (AT) ..................................................... 865/98

(51) Int. Cl.[7] ..................................................... B62D 25/10
(52) U.S. Cl. ................................................. 296/76; 296/76
(58) Field of Search .......................... 296/76, 208, 146.8, 296/146.12, 107.08; 49/339, 344, 345, 354, 355, 356

(56) References Cited

U.S. PATENT DOCUMENTS 5,760,695 * 6/1998 Huber .................................. 340/614
5,788,312 * 6/1998 Lee ........................................ 296/76
6,227,612 * 5/2001 Stolle et al. ......................... 296/208

* cited by examiner

*Primary Examiner*—Stephen T. Gordon
*Assistant Examiner*—Jason Morrow
(74) *Attorney, Agent, or Firm*—Dykema Gossett PLLC

(57) ABSTRACT

An operating arrangement for movable parts on vehicles, especially rear covers, roof coverings or the like, is provided with a connection of the movable part 1 on the vehicle 2 by at least one hinge 3, a hydraulic piston/cylinder device 9 and, in all cases, at least one gas spring, wherein at least one hinge 3 has a lever 7 which ends in the interior of the vehicle and is connected to the hydraulic piston/cylinder device 9 also arranged in the interior of the vehicle for initiating a torque. To combine an optimal protection of the hydraulic piston/cylinder device with a simple construction, an as extensive as possible avoidance of transverse moments on the hinge and operating elements and good problem-free operation of the part 1 to be moved, the lever 7 is connected with the outer lever 6 of the hinge 3 outside of the vehicle body 2, lead through a sealed-off passageway 11 into the interior of the vehicle body 2 and is shaped in a bent manner.

4 Claims, 2 Drawing Sheets

ARRANGEMENT FOR MOVABLE PARTS ON VEHICLES

BACKGROUND OF THE INVENTION

1. Field of the Invention

The invention relates to a operating arrangement for movable parts on vehicles, especially rear covers, roof coverings or the like, with a connection of the movable part on the vehicle by means of at least one hinge, one means of propulsion and, in all cases, at least one gas spring, wherein at least one hinge has a lever which ends in the interior of the vehicle and is connected to a means of propulsion also arranged in the interior of the vehicle for initiating a torque.

2. The Prior Art

Movable part on vehicles, especially rear covers, are connected to the body of the vehicle by means of hinges, in many cases by means of 4-joint hinges. In so doing, mostly there is a gas spring located on each hinge which accepts a part of the weight of the cover and absorbs its movements. In automatically operable rear covers or similar parts, it is the state of the art to replace one of these gas springs with a propulsion unit for the opening and closing of the cover, preferably a hydraulic cylinder. This burdens the covers on one side and furthermore has the substantial disadvantage that the pressure lines have to be lead through the rain gutter and the cylinder itself requires a surface protection. Moreover, the hinge has to be changed to the side of the propulsion device for its inclusion. State of the art is also a construction type in which one of the hinge levers is extended straight into the interior of the vehicle where a propulsion means is connected. This construction, however, has the disadvantage that the passageway through which to lead the hinge lever is difficult to seal off, wherein additionally, through the large lever path, this sealing-off has to occur over a large area. For this reason, this known solution did not succeed. A further solution of the applicant (Austrian patent application A 1968/97) provides an interior lever connected to a means of propulsion which is connected to the outer lever via a pivot pin which is lead through in the rain gutter and transfers the torque. In this construction, transverse moments appear.

SUMMARY OF THE INVENTION

Thus, it was an object of the present invention to create a operating arrangement which combines an optimal protection of the propulsion device with a simple construction, an as extensive as possible avoidance of transverse moments on the hinge and operating elements and good problem-free operation of the part to be moved.

This problem is solved by means of an operating arrangement as initially mentioned, characterized in that the lever is connected to an outer lever of the hinge outside of the body of the vehicle, is lead through a seal-off passageway into the body of the vehicle into its interior and is arranged in a bent manner. The combination can be produced, in principle, by any possible means, for example, through welding, gluing or screwing, that is, rivets. Of course, also a combination is possible through a one-piece production of outer lever and a lever which leads into the interior as an extension thereof The means of propulsion and also its site of connection with the hinge is located in the interior of the vehicle and optimally protected against corrosive media. Therefore, no special surface protection is necessary. Also, no lines have to be lead through the rain gutter or even through the body of the vehicle to the outside, which simplifies its manufacture. The layout of the propulsion device, for example, in the case of a hydraulic cylinder it is its construction, lift, diameter, working pressure etc. is not limited anymore by geometric relationships in the outer area of the hinge, the kinematics of which need not be changed, but can be freely adjusted to the system optimally. Of course, the means of propulsion can be turned off and a purely manual operation of the vehicle part to be moved can occur. Since the propulsion means are not located in the outer area of the hinge, gas springs can be provided on both sides, so that the weight of the vehicle part is absorbed on both sides and thus a one-sided burden can be avoided. Because the lever leading into the interior is bent, the longitudinal movement of the site of the passageway through the body of the vehicle is substantially reduced, through which the sealing-off can be more easily completed and less costly, thereby minimizing the danger of water, corrosive media or dirt entering it. Despite this, due to the relatively large distance of the point of rotation of the outer lever and the connection of the propulsion means to the hinge, that is, to the lever leading inward, the transverse moment which appears in the area of the point of rotation during operation is substantially reduced.

According to the advantageous embodiment of the invention, it is provided that the lever lies in essentially the same plane as the hinge and/or the outer lever connected to it. In this way, the appearing transverse moments can be reduced further, wherein, in the optimal case, the transverse moments can be completely eliminated, if the point of rotation of tie hinge and the lever transferring the torque lie in exactly in the same plane. Of course, in a demand situation, no bending of the lever car be provided.

An especially simple and economical production is possible, if the lever is arranged as a circular arch.

In so doing, it is provided advantageously that the lever runs in the form of a circular arch around the vehicle-fixed point of rotation of the outer lever. In this case, the site of the passageway of the lever through the body of the vehicle is completely fixed and the sealing-off is possible in a simple and safe manner. Thus, for example, a seal, such as a lip seal, can be provided which can be adjusted optimally to the material and the cross-section of the lever leading inward.

According to an advantageous embodiment, the hinge is arranged as a multiple joint hinge, especially as a 4-joint hinge, wherein the lever is preferably connected to the outer lever closest to the middle of the vehicle. This combination of characteristics combines good kinematics of the hinge with optimal opening of the rear cover or other vehicle part with a constructively simple and stable connection of the lever leading inward and thus further the connection of the propulsion means to the hinge.

The propulsion means is preferably a preferably hydraulic working cylinder. This choice of propulsion means allows for an exact operation of the rear cover or the like by means of simple and proven systems.

In so doing, according to an advantageous embodiment, the working cylinder grips with one end, preferably with the piston rod, onto the inner lever of the hinge and is connected with its other end, preferably the floor, to a bottom part of the hinge. In so doing, the hinge itself is used for the connection of the second end of the working cylinder and an additional connection site with additional constructive effort for it can be avoided. It will often be an advantage to use the point of rotation of a vehicle-proximal hinge joint, which without this is necessary, at the same time also as a connection point for the working cylinder and thus to further minimize the constructive and manufacturing efforts.

The invention will be better understood by reference to the following discussion, taken in conjunction with the accompanying drawings.

DETAILED DESCRIPTION OF THE PREFERRED EMBODIMENT

Figure 1:
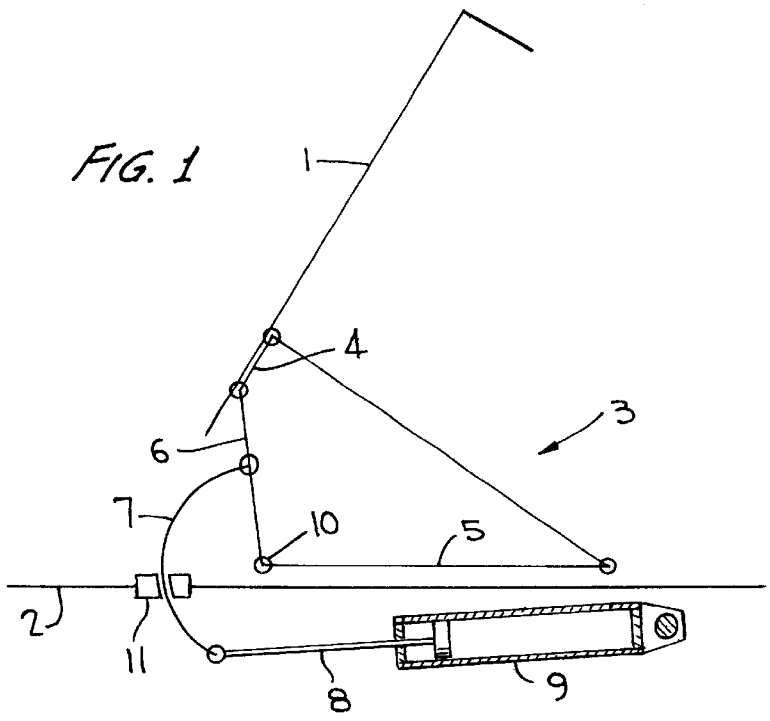
FIG. 1 schematically depicts an operating system according to the present invention connected to a rear (trunk) cover of a vehicle so that it is in an upwardly oriented (open) positioning.
Figure 2:
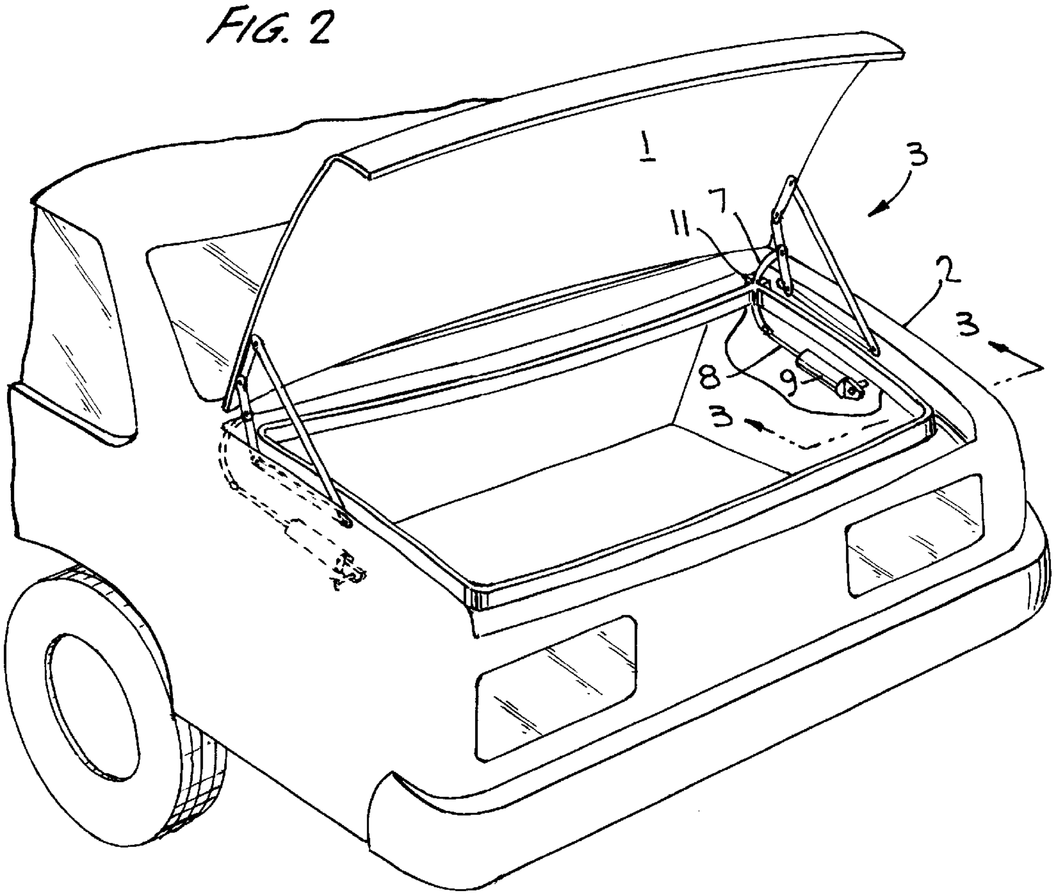
FIG. 2 is a perspective rear view of a vehicle which includes complementary operating systems on opposite sides of the vehicle for moving its trunk cover.
Figure 4:
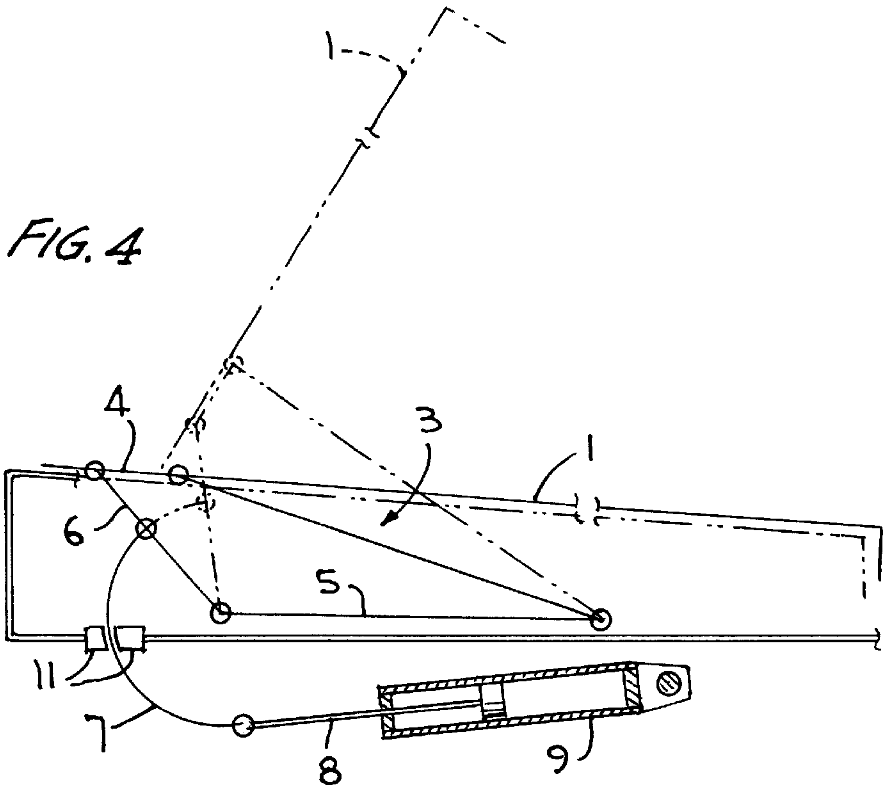
FIG. 4 is a schematic view of the operating system wherein the four-hinge linkage thereof has articulated to pivot the trunk downwardly to a closed positioning over the trunk.
Figure 3:
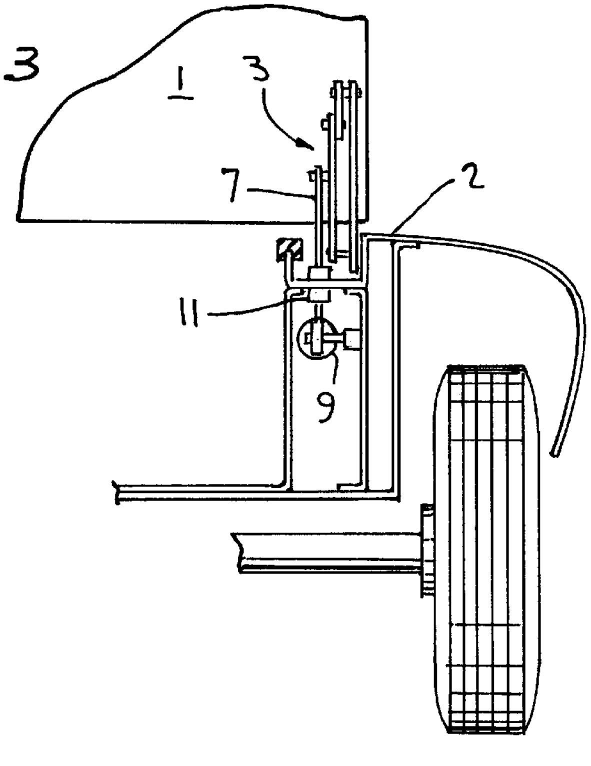
FIG. 3 is a view of FIG. 2 as seen along line 3—3.

A vehicle part, for example, a rear cover 1, engine room covering, covering top, a roof covering or the like of a vehicle is connected to its vehicle body 2, preferably in the area of its rain gutter via a 4-joint hinge 3 as an example of a multiple joint hinge. In so doing, the rear cover 1 connected at the upper part 4 of the hinge to the vehicle-distant points of rotation. The lower part 5 of the hinge and the vehicle-proximal points of rotation are placed on the vehicle body 2, preferably at a side flank of the rain gutter. The tilting movement for the opening and closing of the rear cover 1 is effected through the different length of the hinge lever during its tilting.

According to the invention, preferably the hinge lever 6, which lies proximal to the middle of the vehicle, is connected with a lever 7 which is lead inward into a protected inner chamber of the vehicle body and onto which the piston rod 8 of a hydraulic cylinder 9 employed as a propulsion means. The lever 7 is preferably bent circularly, wherein the mid-point of the circle overlaps with the point of rotation 10 of the outer lever 6 with which the lever 7 is connected. In this way, the site of the passageway of the lever 7 through the vehicle body 2 is fixed and can be easily secured by means of, for example, a lip seal or similar seal elements 11 against penetration of moisture, dirt and the like.

For the opening of the rear cover 1, the piston rod 8 is extended and the lever 7 moved in clockwise direction, wherein, through the circular arch shape and the correspondence of the point of rotation 10 with the mid-point of the circle, a pure rotational movement of the lever 7 occurs without translational component. The turning of the lever 7 in the clockwise direction effects further a tilting of the outer lever 6 of the hinge 3 connected at the point of rotation 10, upon which, on the basis of its geometry, the rear cover 1 or the like is lifted and tilted in the counter-clockwise direction.

Since the lever 7 is distant from the point of rotation 10 and the connecting point of the hinge 3 outside of the lever arrangement of the hinge 3 and lead through the vehicle body 2, there is also the possibility of placing this lever as exactly as possible into the plane of the point of rotation 10 or of the hinge 3, so that the transverse moments can be minimized. Of course, to avoid obstacles or for adjustment to constructive conditions, bends and protrusions can be provided at the lever 7 which, however, can be much fewer than, for example, in direct implementation by means of a pivot pin.

The closing movement is effected by a retraction of the piston rod 8 into the working cylinder 9 and thus a circularly shaped movement of the lever 7 in the counter-clockwise direction, wherein the above-described processes each run in the opposite direction. For the manual operation of the rear cover 1 or the like, the propulsion means, here the working cylinder 9, connected without pressure.

What is claimed is:

1. A combination of a vehicle having a body defining a protected inner chamber and a covering part which is movable toward and away from said body, and an operating system for moving said covering part, said operating system including a four-hinge linkage which is connected to said vehicle body and to said covering part, a hydraulic piston/cylinder device located in said protected inner chamber of said vehicle body, and a curved lever connected between said piston of said piston/cylinder device and a link of said four-hinge linkage, said curved lever extending though a sealed slot in said vehicle body, movement of said curved lever by said piston of said piston/cylinder device causing said four-hinge linkage to move said covering part toward and away from said vehicle body.

2. The combination of claim 1, wherein said vehicle body defines an opening in which said covering part can be positioned, wherein a rain gutter having a side wall extends around a portion of said opening, wherein said four-hinge linkage is attached to said side wall, and wherein said slot through which said lever extends is located in said rain gutter.

3. The combination of claim 2, wherein said covering part is a trunk cover.

4. The combination of claim 3, wherein one link of said four-hinge linkage is located closer to a front end of said vehicle than other links thereof, and wherein said lever is connected to said one link.

* * * * *